Feb. 9, 1926.

E. H. HORN

TIMEPIECE

Filed August 27, 1925

1,572,485

Inventor.
Ernest H Horn
by Seymour Pearce
Attys.

Patented Feb. 9, 1926.

1,572,485

UNITED STATES PATENT OFFICE.

ERNEST H. HORN, OF WATERBURY, CONNECTICUT, ASSIGNOR TO WATERBURY CLOCK CO., OF WATERBURY, CONNECTICUT, A CORPORATION.

TIMEPIECE.

Application filed August 27, 1925. Serial No. 52,723.

*To all whom it may concern:*

Be it known that I, ERNEST H. HORN, a citizen of the United States, residing at Waterbury, in the county of New Haven and State of Connecticut, have invented a new and useful Improvement in Timepieces; and I do hereby declare the following, when taken in connection with the accompanying drawings and the characters of reference marked thereon, to be a full, clear, and exact description of the same, and which said drawings constitute part of this application, and represent, in—

Figure 1:
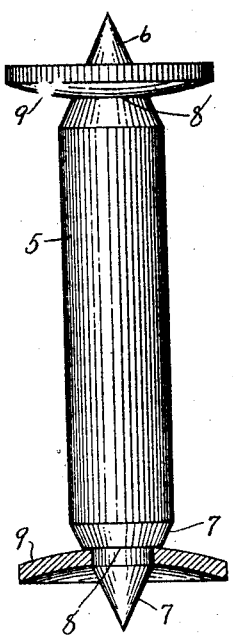

Fig. 1, a side view partly in section of a balance staff constructed in accordance with my invention.

Figure 2:
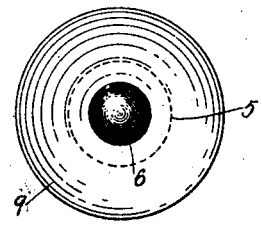

Fig. 2, an end view thereof.

Figure 3:
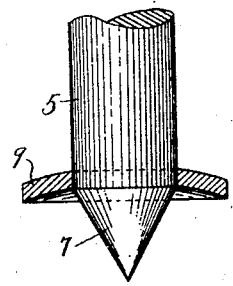
Figure 4:
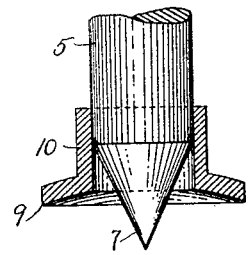

Fig. 3, and Fig. 4, side views, partly in section illustrating modified forms.

This invention relates to an improvement in timepieces with particular reference to the balance staffs therefor. The object of the invention is to provide the balance staffs with concave disks or washers at their ends whereby oil employed for lubricating the shaft bearings will be prevented from being withdrawn therefrom and allowed to flow over the staff by capillary action and the invention consists in the construction as hereinafter described and particularly recited in the claims.

In carrying out my invention as shown in Fig. 1, of the drawings I employ a staff 5, of usual construction having tapering ends 6 and 7 which are cut to form annular shoulders 8. Set over the ends are washers or disks 9 which are seated on the shoulder 8 and the outer faces of the disks are cupped so as to bow outward toward the ends of the staff. In some cases, as shown in Fig. 3, the shoulders 8 may be omitted and the disk mounted on the main body of the staff closely adjacent to the tapered ends thereof. If it should be desired to have the disks located nearer to the bearings of the staff the disks may be formed with collars 10 to extend onto the main body of the staff as shown in Fig. 4, of the drawings. In either construction the concave disks prevent the oil in the bearings from being withdrawn by capillary action and carried to the hair spring or other parts which would tend to the accumulation of dust resulting in an imperfect operation of the clock movement.

I claim:

1. A balance staff for time-pieces having tapering ends and concave disks applied to the ends of the staff.

2. A balance staff for time-pieces having tapering ends and annular shoulders in the ends, and concaved disks set over the ends and seated on said shoulders.

In testimony whereof, I have signed this specification.

ERNEST H. HORN.